(12) United States Patent
Huang

(10) Patent No.: US 6,739,328 B2
(45) Date of Patent: May 25, 2004

(54) BARBECUE STOVE STRUCTURE HAVING A SWITCH

(76) Inventor: Chung-Chin Huang, 58, Ma Yuan West St., Taichung (TW)

( * ) Notice: Subject to any disclaimer, the term of this patent is extended or adjusted under 35 U.S.C. 154(b) by 189 days.

(21) Appl. No.: 10/087,165

(22) Filed: Feb. 27, 2002

(65) Prior Publication Data

US 2003/0159689 A1 Aug. 28, 2003

(51) Int. Cl.$^7$ ............................... F24N 5/00; F24B 1/00
(52) U.S. Cl. ..................................... 126/39 E; 126/19
(58) Field of Search ..................... 431/127, 28, 78; 126/39; 137/66

(56) References Cited

U.S. PATENT DOCUMENTS 5,525,771 A * 6/1996 Lund ....................... 200/61.86
6,322,352 B1 * 11/2001 Zink ............................ 431/27

* cited by examiner

Primary Examiner—Henry Bennett
Assistant Examiner—Sabrina Dagostino

(57) ABSTRACT

A barbecue stove structure having a switch includes a support frame, multiple flow rate control valves, and multiple press plates. When the control knob is rotated, the drive rod of the flow rate control valve and the press plate may be rotated by the control knob, so that the contact and press portion of the press plate contacts and presses the signal receiving terminal of the switch, so that the control circuit of the electric power device may output a current to an igniter of each of the burner heads, so that each of the burner heads may ignite and burn.

7 Claims, 5 Drawing Sheets

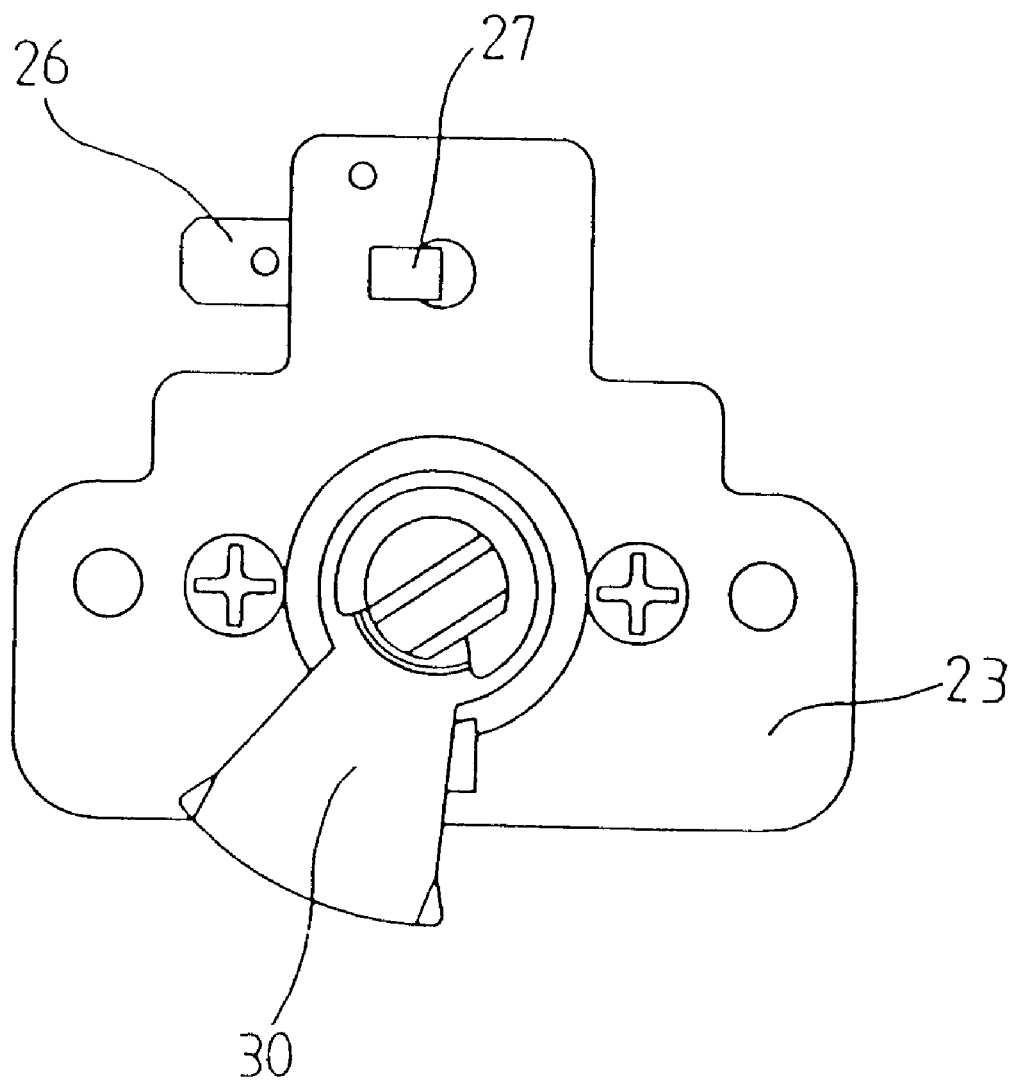
F I G. 6

BARBECUE STOVE STRUCTURE HAVING A SWITCH

BACKGROUND OF THE INVENTION

1. Field of the Invention

The present invention relates to a barbecue stove structure having a switch, and more particularly to a barbecue stove structure having a switch, wherein by provision of the press plate, the burner head may be ignited and burned easily by the switch of the barbecue stove structure.

2. Description of the Related Art

A conventional barbecue stove structure in accordance with the prior art comprises an ignition switch for igniting and burning the burner head of the barbecue stove structure. However, the ignition efficiency of the ignition switch is not excellent. In addition, the ignition switch has a complicated construction and a short lifetime, thereby increasing the cost of production.

SUMMARY OF THE INVENTION

The present invention has arisen to mitigate and/or obviate the disadvantage of the conventional barbecue stove structure.

The primary objective of the present invention is to provide a barbecue stove structure having a switch, wherein by provision of the press plate, the burner head may be ignited and burned easily by the switch of the barbecue stove structure.

Another objective of the present invention is to provide a barbecue stove structure having a switch, wherein by provision of the press plate, the parts of the switch of the barbecue stove structure may be simplified, so that the ignition switch may be assembled easily, and may decrease the cost of production.

A further objective of the present invention is to provide a barbecue stove structure having a switch, wherein by provision of the contact and press portion of the press plate, the contact time of the press plate and the switch may be prolonged, thereby enhancing the ignition efficiency.

A further objective of the present invention is to provide a barbecue stove structure having a switch, wherein by provision of the two wings of the press plate, the press plate may contact with and detach from the switch easily and rapidly, thereby enhancing the ignition efficiency.

In accordance with the present invention, there is provided a barbecue stove structure having a switch, comprising a support frame, multiple flow rate control valves, and multiple press plates, wherein;

the support frame is provided with a control zone for mounting an electric power device and multiple flow rate control valves, multiple burner heads are mounted in the support frame, the electric power device is provided with a control circuit for controlling output of the current of the electric power device, each of the multiple flow rate control valves is provided with a drive rod which has a distal end formed with a locking groove, each of the multiple press plates has a circular lower portion formed with a circular locking hole, and a planar upper portion formed with a contact and press portion which is provided with two opposite wings, the drive rod of each of the multiple flow rate control valves is in turn provided with a fixing plate, a press plate, an elastic member and a snap ring, and is secured with a control knob, the fixing plate of each of the multiple flow rate control valves has a top secured with a switch which includes an output terminal, and a signal receiving terminal, the electric power device has a signal line connected to the output terminal of the switch of each of the multiple flow rate control valves, so that the switches of the multiple flow rate control valves may be serially connected with each other;

when the control knob is rotated, the drive rod of the flow rate control valve and the press plate may be rotated by the control knob, so that the contact and press portion of the press plate contacts and presses the signal receiving terminal of the switch, so that the control circuit of the electric power device may output a current to an igniter of each of the burner heads, so that each of the burner heads may ignite and burn.

Further benefits and advantages of the present invention will become apparent after a careful reading of the detailed description with appropriate reference to the accompanying drawings.

BRIEF DESCRIPTION OF THE DRAWINGS

FIG. 6 is a side plan operational view of the barbecue stove structure having a switch taken as shown in FIG. 3.

DETAILED DESCRIPTION OF THE INVENTION

Figure 1:
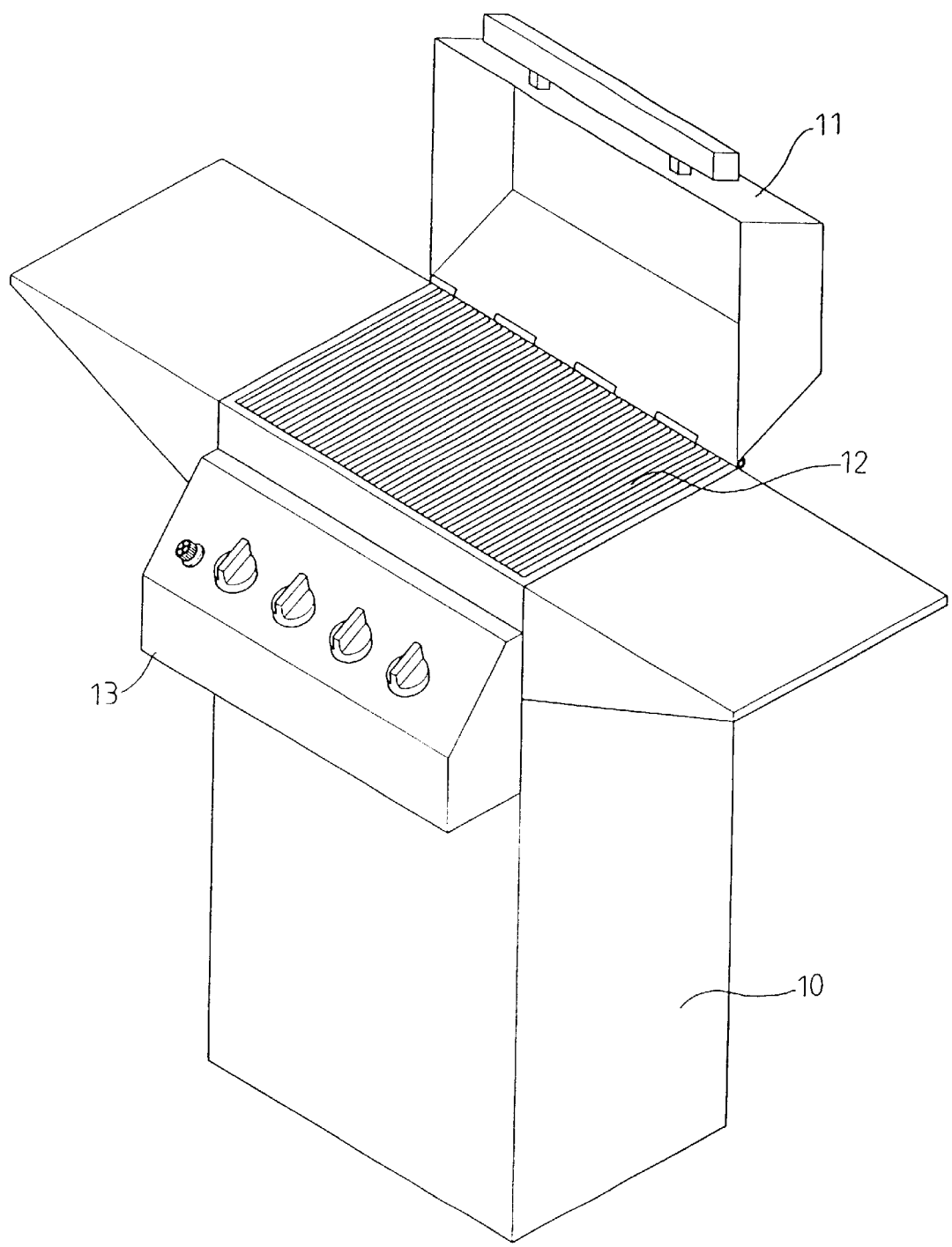
FIG. 1 is a perspective view of a barbecue stove structure having a switch in accordance with a preferred embodiment of the present invention.
Figure 2:
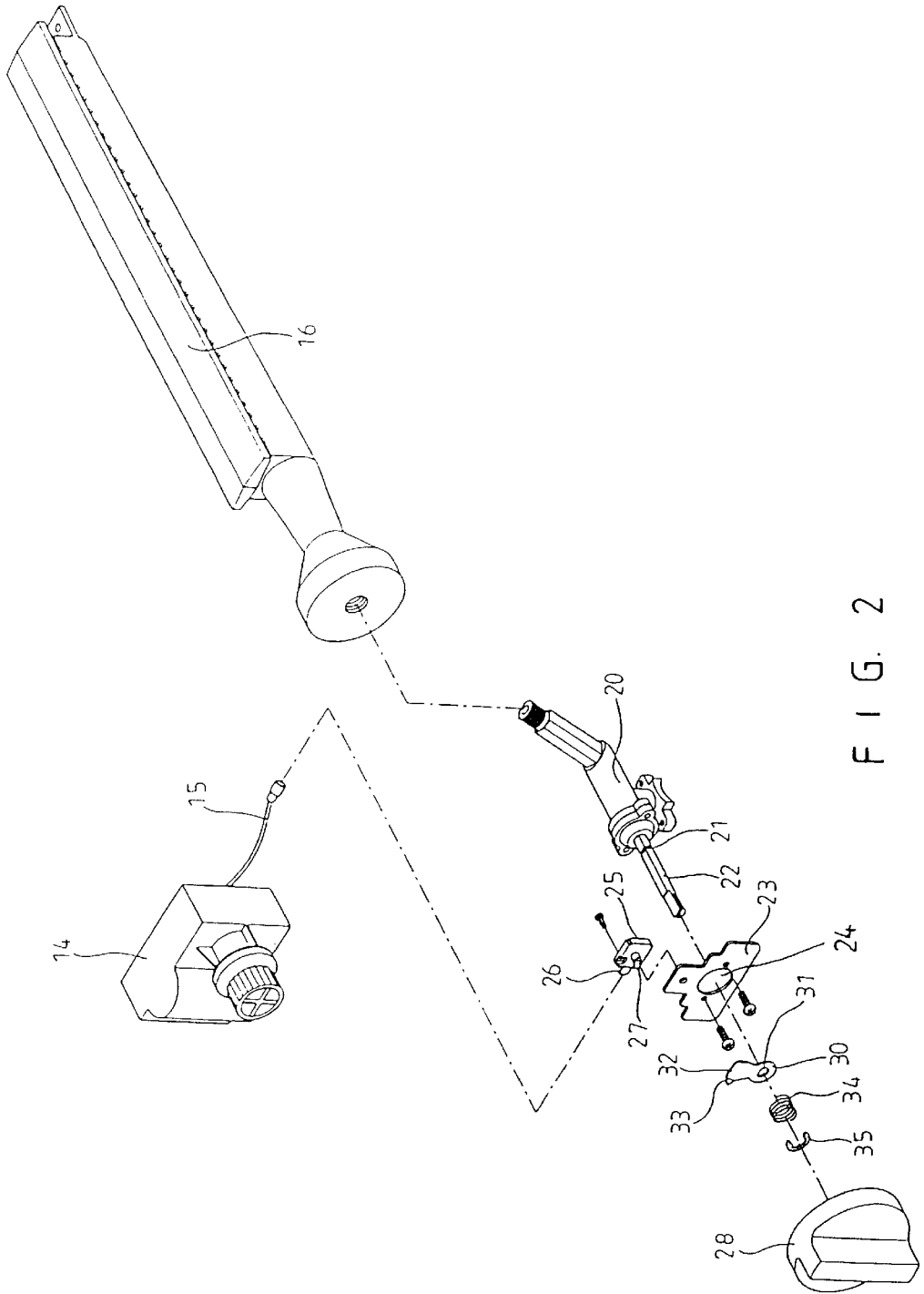
FIG. 2 is an exploded perspective view of a barbecue stove structure having a switch in accordance with a preferred embodiment of the present invention.
Figure 3:
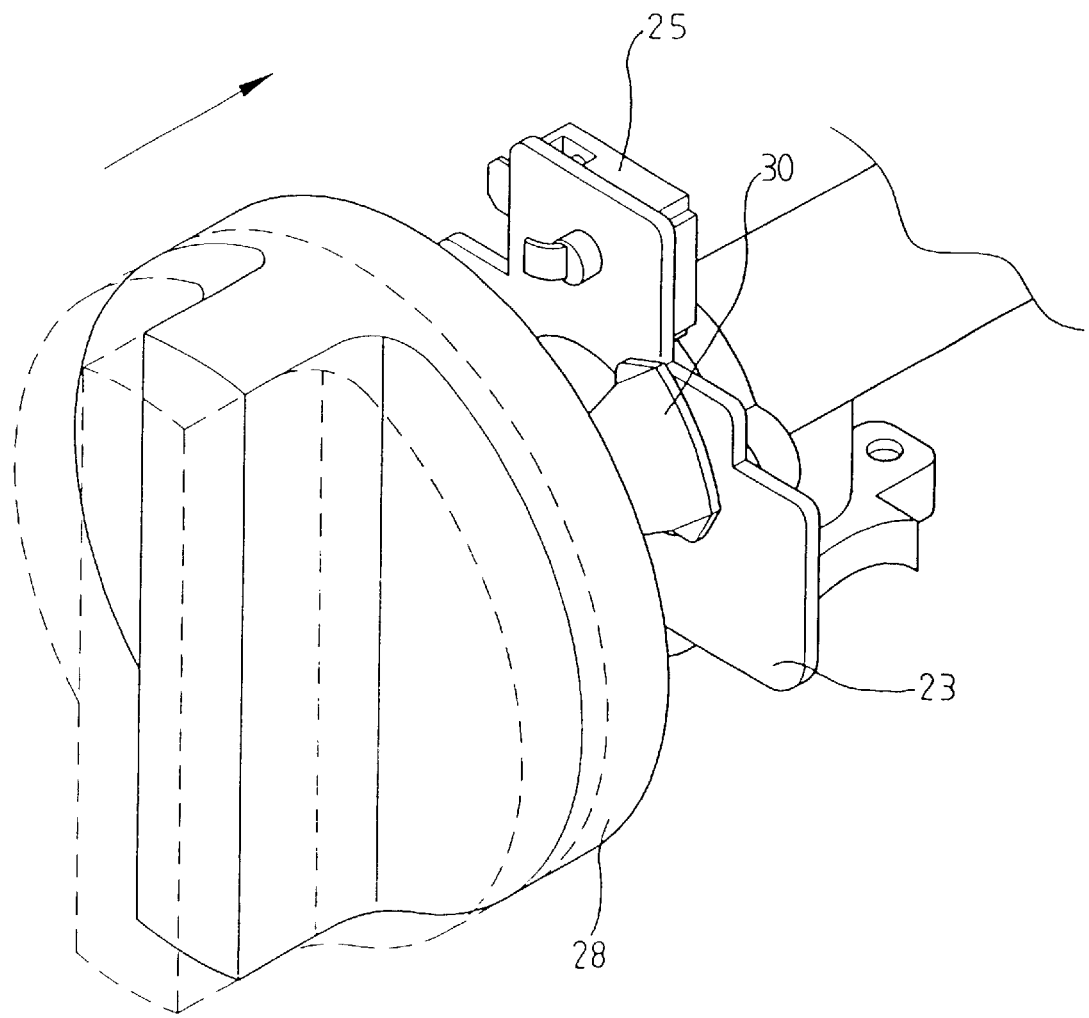
FIG. 3 is a partially cut-away enlarged perspective view of a barbecue stove structure having a switch in accordance with a preferred embodiment of the present invention.
Figure 4:
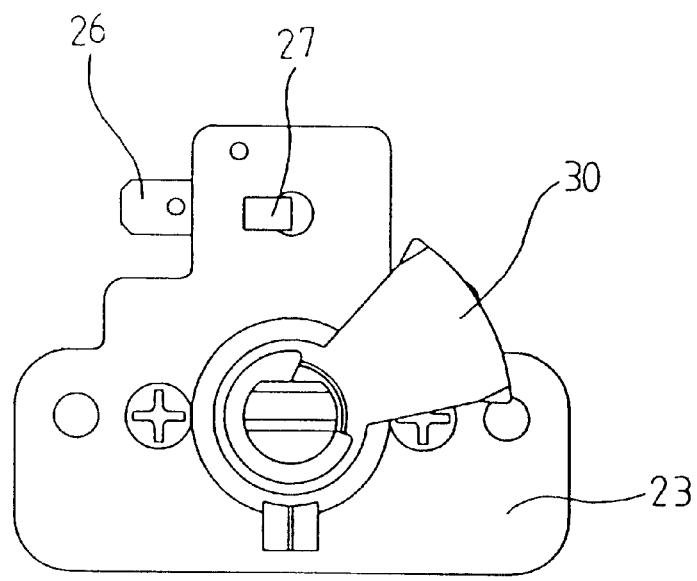
FIG. 4 is a side plan operational view of the barbecue stove structure having a switch taken as shown in FIG. 3.
Figure 5:
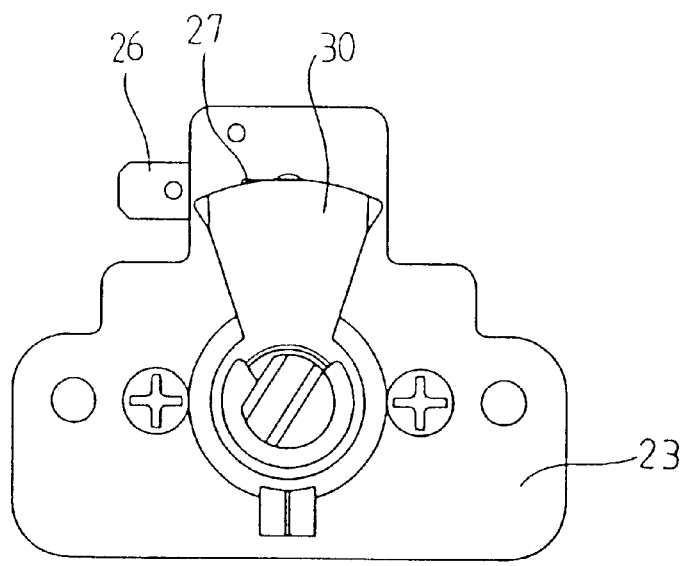
FIG. 5 is a side plan operational view of the barbecue stove structure having a switch taken as shown in FIG. 3.

Referring to the drawings and initially to FIGS. 1–3, a barbecue stove structure having a switch in accordance with a preferred embodiment of the present invention comprises a support frame 10, multiple flow rate control valves 20, and multiple press plates 30.

The support frame 10 has a top provided with a broiling zone 12, and a top cover 11 is pivotally mounted on the top of the support frame 10. Multiple burner heads 16 are mounted in the support frame 10, and are located under the broiling zone 12. A control zone 13 is mounted on the support frame 10, and are located in front of the broiling zone 12. An electric power device 14 is mounted in the control zone 13. The electric power device 14 is provided with a control circuit for controlling output of the current of the electric power device 14, and the current may be converted from a low-voltage current into a high-voltage current by the control circuit.

Each of the multiple flow rate control valves 20 is provided with a drive rod 21 which has a distal end formed with a locking groove 22. The drive rod 21 is formed with a plane.

Each of the multiple press plates 30 has a circular lower portion formed with a circular locking hole 31, and a planar upper portion formed with a contact and press portion 32 which is provided with two opposite wings 33. Each of the two opposite wings 33 is bent with a determined angle.

Each of the multiple flow rate control valves 20 is locked in the support frame 10 respectively, and is connected to a respective one of the burner heads 16.

The drive rod 21 of each of the multiple flow rate control valves 20 is in turn provided with a fixing plate 23, a press plate 30, an elastic member 34 and a C-shaped snap ring 35, and is secured with a control knob 28. The fixing plate 23 of each of the multiple flow rate control valves 20 has a center formed with a circular hole 24. The fixing plate 23 of each of the multiple flow rate control valves 20 has a top secured with a switch 25 which includes an output terminal 26, and a signal receiving terminal 27. The electric power device 14 has a signal line 15 connected to the output terminal 26 of the switch 25 of each of the multiple flow rate control valves 20, so that the switches 25 of the multiple flow rate control valves 20 may be serially connected with each other. The C-shaped snap ring 35 is locked in the locking groove 22 of the drive rod 21 of each of the multiple flow rate control valves 20. The press plate 30 is urged on the fixing plate 23 by the elastic member 34.

Referring to FIGS. 3–6 with reference to FIGS. 1 and 2, when the control knob 28 is pushed and pressed, the drive rod 21 of the flow rate control valve 20 may be moved forward, so that the drive rod 21 of the flow rate control valve 20 may be rotated. The press plate 30 is urged on the fixing plate 23 by the elastic member 34. When the control knob 28 is rotated, the drive rod 21 of the flow rate control valve 20 and the press plate 30 may be rotated by the control knob 28, so that the inside of the flow rate control valve 20 may form a flow connection state, and the gas may flow toward the burner head 16.

The contact and press portion 32 of the press plate 30 contacts and presses the signal receiving terminal 27 of the switch 25, so that the control circuit of the electric power device 14 may receive a signal to output a high-voltage current to the igniter of each of the burner heads 16, so that each of the burner heads 16 may ignite and burn. Then, the control knob 28 may be further rotated sideward, thereby outputting gas having the maximum flow rate.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A barbecue stove structure having a switch, comprising a support frame, multiple flow rate control valves, and multiple press plates, wherein;

the support frame is provided with a control zone for mounting an electric power device and multiple flow rate control valves, multiple burner heads are mounted in the support frame, the electric power device is provided with a control circuit for controlling output of the current of the electric power device, each of the multiple flow rate control valves is provided with a drive rod which has a distal end formed with a locking groove, each of the multiple press plates has a circular lower portion formed with a circular locking hole, and a planar upper portion formed with a contact and press portion which is provided with two opposite wings, the drive rod of each of the multiple flow rate control valves is in turn provided with a fixing plate, a press plate, an elastic member and a snap ring, and is secured with a control knob, the fixing plate of each of the multiple flow rate control valves has a top secured with a switch which includes an output terminal, and a signal receiving terminal, the electric power device has a signal line connected to the output terminal of the switch of each of the multiple flow rate control valves, so that the switches of the multiple flow rate control valves may be serially connected with each other;

when the control knob is rotated, the drive rod of the flow rate control valve and the press plate may be rotated by the control knob, so that the contact and press portion of the press plate contacts and presses the signal receiving terminal of the switch, so that the control circuit of the electric power device may output a current to an igniter of each of the burner heads, so that each of the burner heads may ignite and burn.

2. The barbecue stove structure having a switch in accordance with claim 1, further comprising a top cover pivotally mounted on a top of the support frame.

3. The barbecue stove structure having a switch in accordance with claim 1, wherein the drive rod is formed with a plane.

4. The barbecue stove structure having a switch in accordance with claim 1, wherein each of the two opposite wings is bent with a determined angle.

5. The barbecue stove structure having a switch in accordance with claim 1, wherein the snap ring is C-shaped, and is locked in the locking groove of the drive rod of each of the multiple flow rate control valves.

6. The barbecue stove structure having a switch in accordance with claim 1, wherein the fixing plate of each of the multiple flow rate control valves has a center formed with a circular hole.

7. The barbecue stove structure having a switch in accordance with claim 1, wherein the press plate is urged on the fixing plate by the elastic member.

* * * * *